(12) United States Patent
Harada

(10) Patent No.: US 10,466,270 B2
(45) Date of Patent: Nov. 5, 2019

(54) CONDUCTIVE PROBE, ELECTRICAL PROPERTY EVALUATING SYSTEM, SCANNING PROBE MICROSCOPE, CONDUCTIVE PROBE MANUFACTURING METHOD, AND ELECTRICAL PROPERTY MEASURING METHOD

(71) Applicant: KABUSHIKI KAISHA TOSHIBA, Minato-ku (JP)

(72) Inventor: Kazunori Harada, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/701,495

(22) Filed: Sep. 12, 2017

(65) Prior Publication Data
US 2018/0074093 A1  Mar. 15, 2018

(30) Foreign Application Priority Data
Sep. 13, 2016 (JP) ................................. 2016-178212

(51) Int. Cl.
*G01Q 10/04* (2010.01)
*G01Q 60/30* (2010.01)

(52) U.S. Cl.
CPC .................................... *G01Q 10/04* (2013.01)

(58) Field of Classification Search
CPC ........ G01Q 70/14; G01Q 70/16; G01Q 70/02; G01Q 60/38; G01Q 60/40; G01Q 60/30
USPC ............ 250/307; 850/23, 40, 56, 60, 26, 29
See application file for complete search history.

(56) References Cited

U.S. PATENT DOCUMENTS

| | | | | | |
|---|---|---|---|---|---|
| 5,077,473 | A | * | 12/1991 | Elings | B82Y 35/00 250/307 |
| 5,386,720 | A | * | 2/1995 | Toda | B82Y 35/00 250/307 |
| 5,416,327 | A | * | 5/1995 | Weiss | B82Y 35/00 250/306 |
| 5,419,807 | A | * | 5/1995 | Akram | G01R 1/06711 257/E21.59 |
| 5,537,863 | A | * | 7/1996 | Fujiu | B82Y 35/00 73/105 |
| 5,742,377 | A | * | 4/1998 | Minne | B82Y 10/00 355/71 |
| 5,811,017 | A | * | 9/1998 | Matsuyama | G01Q 60/38 216/11 |
| 5,886,922 | A | * | 3/1999 | Saito | G11B 9/14 365/151 |
| 5,923,033 | A | * | 7/1999 | Takayama | B82Y 35/00 250/234 |
| 5,929,438 | A | * | 7/1999 | Suzuki | B82Y 35/00 136/228 |

(Continued)

FOREIGN PATENT DOCUMENTS

| | | | | |
|---|---|---|---|---|
| EP | 0785410 A2 | * | 7/1997 | ........... G11B 9/1409 |
| JP | 08-050872 A | | 2/1996 | |

(Continued)

*Primary Examiner* — David A Vanore
(74) *Attorney, Agent, or Firm* — Oblon, McClelland, Maier & Neustadt, L.L.P.

(57) ABSTRACT

A conductive probe includes a protruding portion provided on an elastic member, a conductive metal film covering at least a tip of the protruding portion; and an insulating thin film covering the conductive metal film provided on the tip of the protruding portion.

9 Claims, 6 Drawing Sheets

(56) References Cited

U.S. PATENT DOCUMENTS

| | | | | |
|---|---|---|---|---|
| 5,959,957 A * | 9/1999 | Ikeda | ............... | G11B 9/1409 369/126 |
| 6,057,547 A * | 5/2000 | Park | ............... | B82Y 35/00 850/10 |
| 6,094,971 A * | 8/2000 | Edwards | ............... | B82Y 35/00 73/105 |
| 6,139,759 A * | 10/2000 | Doezema | ............... | B82Y 35/00 216/11 |
| 6,918,286 B2 * | 7/2005 | Kitazawa | ............... | G01Q 70/10 73/105 |
| 7,960,695 B1 * | 6/2011 | Kley | ............... | B82Y 35/00 250/216 |
| 9,389,244 B2 * | 7/2016 | Goeckeritz | ............... | G01Q 70/14 |
| 2002/0008530 A1 * | 1/2002 | Kim | ............... | G01R 1/06727 324/755.07 |
| 2002/0024279 A1 * | 2/2002 | Simpson | ............... | B82Y 10/00 313/309 |
| 2002/0179833 A1 * | 12/2002 | Shirakawabe | ............... | G01Q 10/06 850/10 |
| 2007/0006455 A1 * | 1/2007 | Belov | ............... | G11B 9/065 29/847 |
| 2007/0025907 A1 * | 2/2007 | Rezeq | ............... | B82Y 35/00 423/447.3 |
| 2007/0041238 A1 * | 2/2007 | Belov | ............... | B82Y 10/00 365/151 |
| 2007/0230233 A1 * | 10/2007 | Takahashi | ............... | B82Y 10/00 365/145 |
| 2010/0115672 A1 * | 5/2010 | Mirkin | ............... | G01Q 20/04 850/19 |
| 2010/0142091 A1 * | 6/2010 | Tsukamoto | ............... | B82Y 10/00 360/135 |
| 2014/0231379 A1 * | 8/2014 | Pitters | ............... | B82Y 35/00 216/11 |
| 2014/0338075 A1 * | 11/2014 | Goeckeritz | ............... | G01Q 70/14 850/59 |

FOREIGN PATENT DOCUMENTS

| | | |
|---|---|---|
| JP | 2001-062791 A | 3/2001 |
| JP | 2009-092554 | 4/2009 |
| JP | 2013-186106 | 9/2013 |

* cited by examiner

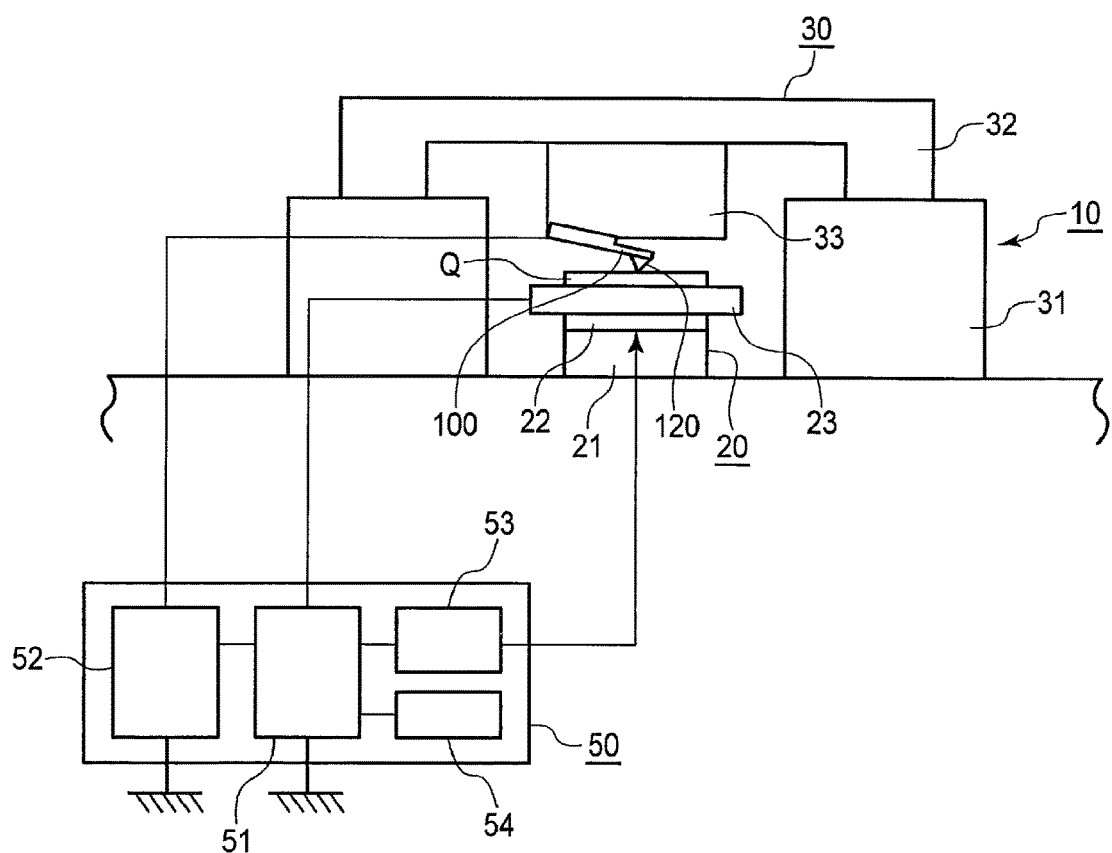
F I G. 1

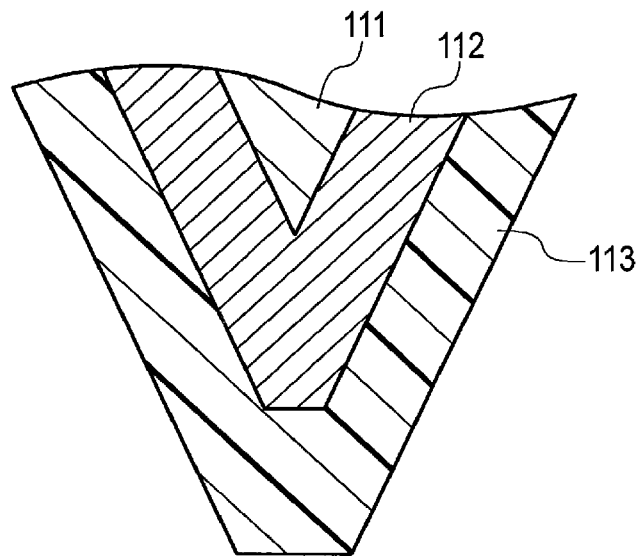
F I G. 3
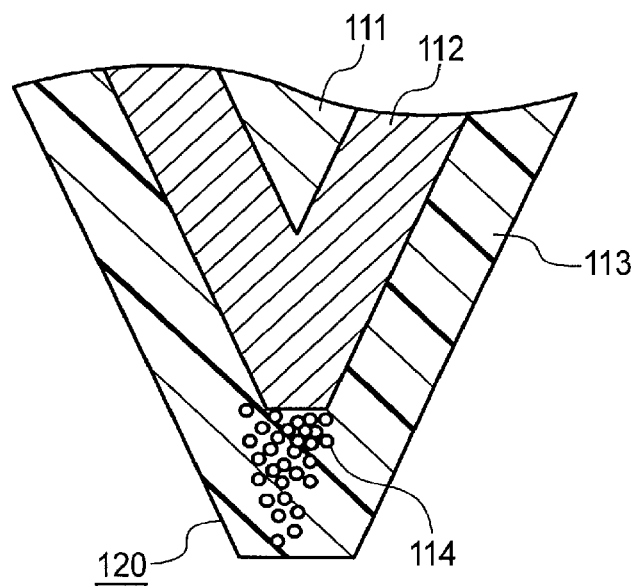
F I G. 4

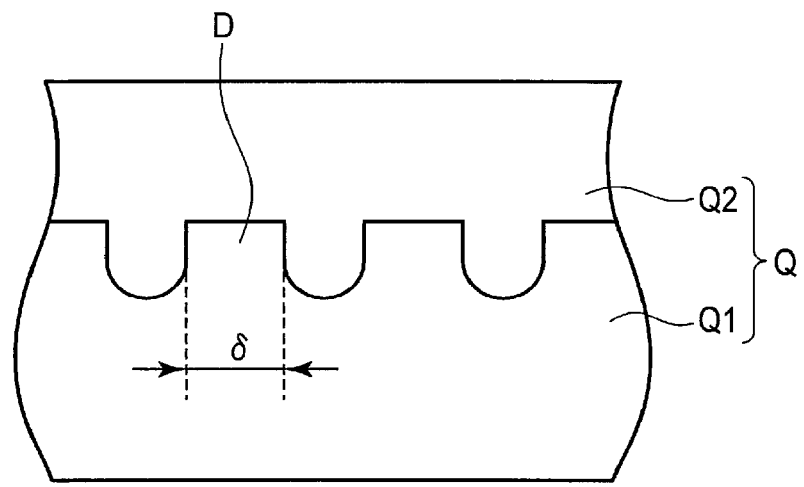
F I G. 6
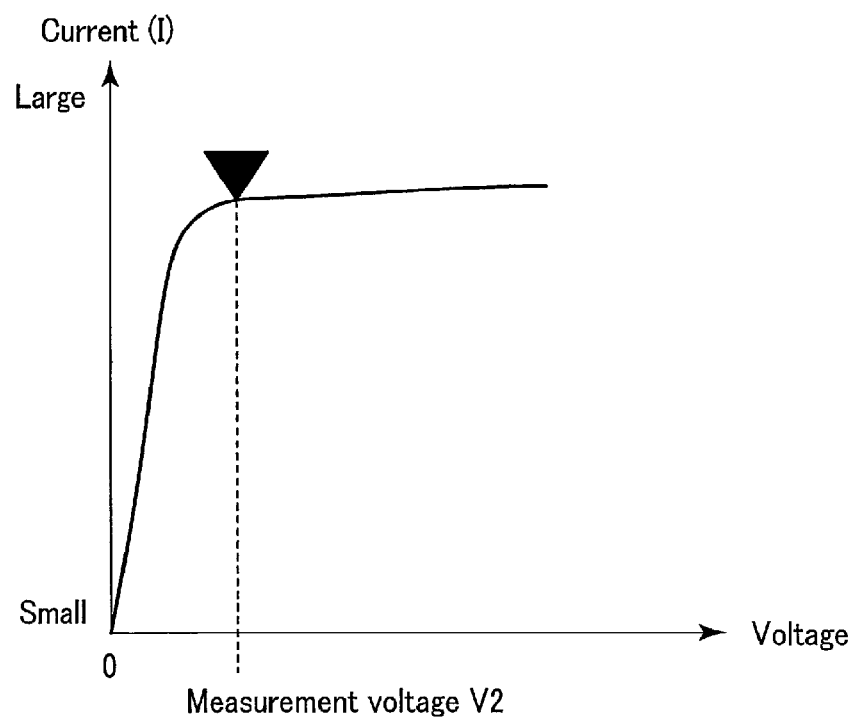
F I G. 7

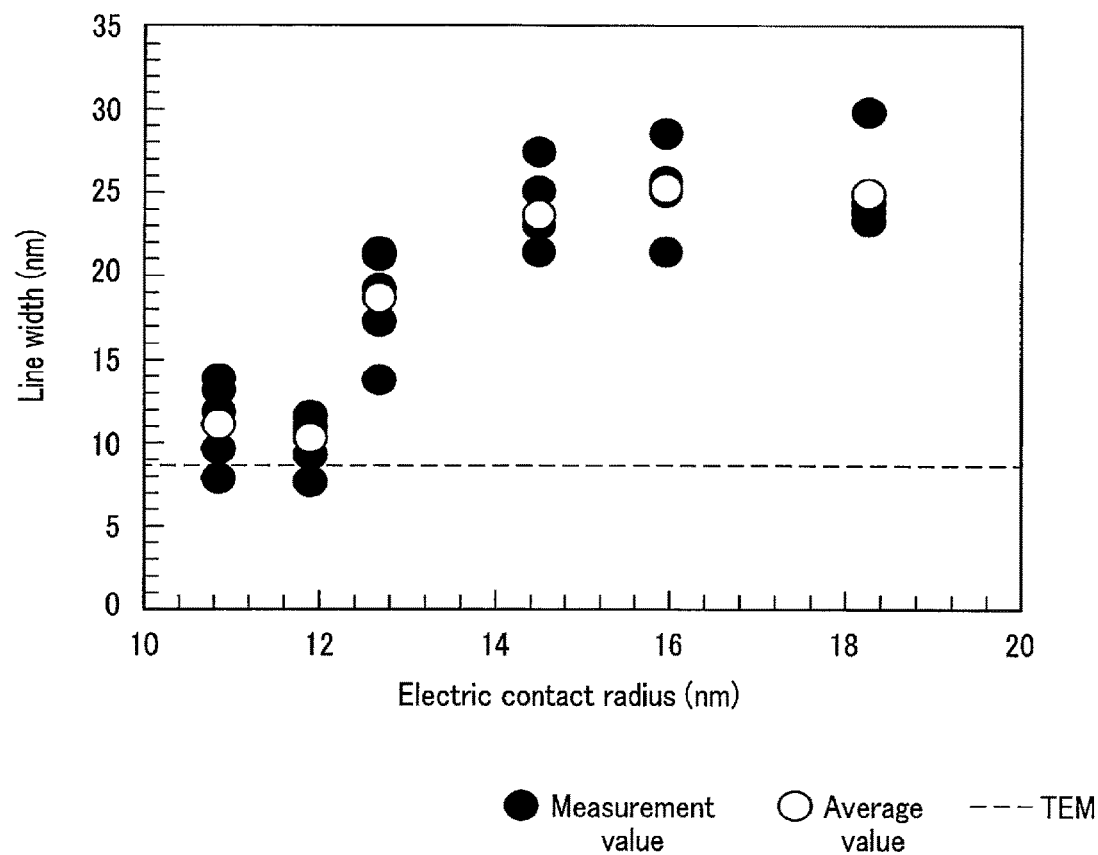
F I G. 8

CONDUCTIVE PROBE, ELECTRICAL PROPERTY EVALUATING SYSTEM, SCANNING PROBE MICROSCOPE, CONDUCTIVE PROBE MANUFACTURING METHOD, AND ELECTRICAL PROPERTY MEASURING METHOD

CROSS-REFERENCE TO RELATED APPLICATION

This application is based upon and claims the benefit of priority from the prior Japanese Patent Application No. 2016-178212, filed Sep. 13, 2016, the entire contents of which is incorporated herein by reference.

FIELD

Embodiments described herein relate to a conductive probe, an electrical property evaluating system, a scanning probe microscope, a conductive probe manufacturing method, and an electrical property measuring method.

BACKGROUND

There have been known methods for performing electrical measurement while scanning the surface of a sample with a probe having a small tip diameter in order to measure the electrical property of the minute region of the sample. Among them, a scanning probe microscope (SPM) which scans a sample surface with a probe of a nano order to measure the shape of the sample is widely used also in electric measurement.

A conductive probe used in the scanning probe microscope includes a cantilever having a conductive probe provided at a tip of the cantilever. The probe is scanned while the probe is pressed against the surface of a sample with a constant force, and a voltage is applied between the probe and the sample, to allow the electrical property measurement and mapping of the minute region to be performed.

The scanning probe microscope can evaluate local electrical property, but its spatial resolution is greatly affected by the tip radius of the probe. Since the conductive probe is normally made by vapor-depositing a conductive film such as a metal thin film on the surface of a shape measuring probe, the tip radius of the probe is at least about 20 nm. In order to obtain stable conductivity, the probe is covered with a conductive film made of Au, Pt, PtIr, or Rh having excellent oxidation resistance.

Since the tip of the probe is brought into contact with the surface of the sample whenever the electric resistance value of the sample is measured, the conductive film with which the probe is covered may be worn to cause impaired conductivity.

This requires a high spatial resolution which can be achieved in the measurement due to the conductive probe, and conductivity which can be maintained for a long time.

BRIEF DESCRIPTION OF THE DRAWINGS

FIG. 1 is a front view schematically showing a scanning probe microscope according to a first embodiment;

FIG. 3 is an explanatory view showing the manufacturing step of the conductive probe;

FIG. 4 is an explanatory view showing the manufacturing step of the conductive probe;

FIG. 6 is an explanatory view showing a measuring method using the conductive probe;

FIG. 7 is an explanatory view showing a measuring method using the conductive probe; and FIG. 8 is an explanatory view showing the relationship between the electric contact radius of a normal conductive probe and the measured line width.

DETAILED DESCRIPTION

A conductive probe according to one embodiment includes a protruding portion provided on an elastic member, a conductive metal film covering at least a tip of the protruding portion; and an insulating thin film covering the conductive metal film provided on the tip of the protruding portion.

Figure 2:
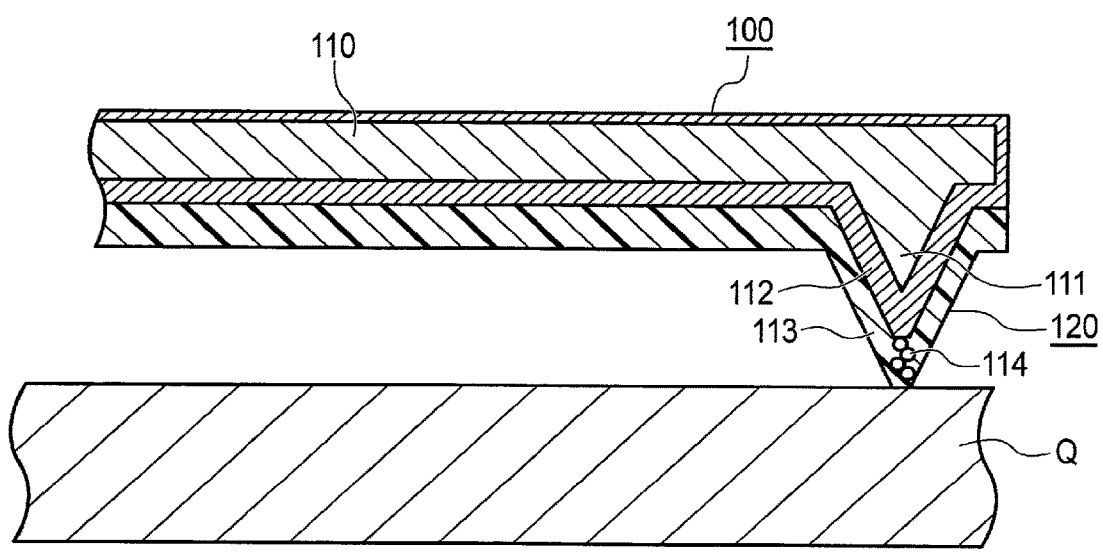
FIG. 2 is a cross-sectional view showing the tip portion of a conductive probe incorporated in the scanning probe microscope, and a sample.

FIG. 1 is a front view schematically showing a scanning probe microscope 10 according to a first embodiment, and FIG. 2 is a cross-sectional view showing the tip portion of a conductive probe 100 incorporated in the scanning probe microscope 10, and a sample Q. The scanning probe microscope 10 can also be used as an electrical property evaluating system.

As shown in FIG. 1, the scanning probe microscope 10 includes a sample supporting mechanism 20, a measuring mechanism 30, and a controlling portion 50 which cooperatively controls them. The sample supporting mechanism 20 includes a base table 21 provided on a floor surface, a horizontal scanning mechanism 22 disposed on the base table 21, and a sample stage 23 which is provided on the horizontal scanning mechanism 22 and on which a sample Q to be measured is placed.

The measuring mechanism 30 includes a base 31 disposed so as to surround the base table 21, a housing portion 32 supported by the base 31, and a probe holder 33 disposed below the housing portion 32 and above the sample stage 23, and holding a conductive probe 100 to be described later.

The controlling portion 50 includes a power supply portion 51 applying a voltage between the conductive probe 100 and the sample Q, a detecting portion 52 detecting a current flowing through the conductive probe 100, and a scanning controlling portion 53 operating the horizontal scanning mechanism 22 controlling a relative position between the conductive probe 100 and the sample stage 23, to cause the conductive probe 100 to scan the sample Q. The controlling portion 50 includes an image producing portion 54 producing an image based on detection results due to the detecting portion 52, and relative position information of the sample Q and conductive probe 100 due to the scanning controlling portion 53.

As shown in FIGS. 1 and 2, the base end side of the conductive probe 100 is attached to the probe holder 33, and the conductive probe 100 includes a cantilevered elastic member made of Si or SiN, for example, a cantilever 110 formed of a plate spring member. On the tip side of the cantilever 110, a protruding portion 111 having a downward cone shape (for example, a triangular cone shape and a circular cone shape or the like) is formed. The cantilever 110 is made of Si or SiN. The entire surface of the cantilever 110 is covered with a conductive metal film 112 having a thickness of about 2 to 3 nm. The conductive metal film 112 covering at least the side of the cantilever 110 which faces the sample Q is further covered with an insulating thin film 113 of about 5 to 10 nm.

In the insulating thin film 113, a probe 120 is formed by a conductive filament 114 formed by diffusing a part of the conductive metal film 112 (see FIG. 4).

The conductive metal film 112 is formed of at least one of Ag, Cu, Ni, Ti, and W, or an alloy containing these metals. The insulating thin film is formed of at least one of $SiO_2$, SiON, $Ta_2O_5$ ($Ta_mO_n$), AlO ($Al_mO_n$), GeSe, $W_mO_n$ and $Mo_mO_n$, or a compound containing these.

In the case of using Ag, Ni, Ti and W as the conductive metal film 112, the conductive filament 114 is easily formed when $SiO_2$ or SiON is used for the insulating thin film 113. When Cu is used as the conductive metal film 112, the conductive filament 114 is easily formed when $Ta_2O_5$, AlO and GeSe in addition to $SiO_2$ and SiON are used for the insulating thin film 113.

Next, the manufacturing step of the conductive probe 100 will be described. When the conductive probe 100 is manufactured, the conductive filament 114 is formed, or the conductive filament 114 is not formed. Even when the conductive filament 114 is not formed during the manufacture, the conductive filament 114 can be easily formed by a simple operation after the user attaches the conductive probe 100 to the scanning probe microscope 10. Hereinafter, a case where the conductive probe 100 is shipped in a state where the conductive filament 114 is not formed will be described.

As shown in FIG. 3, the protruding portion 111 of the conductive probe 100 before attaching (before using) is covered with the conductive metal film 112 and the insulating thin film 113. First, the conductive probe 100 is attached to the probe holder 33 of the scanning probe microscope 10. The probe 120 of the conductive probe 100 is brought into contact with the surface of the sample Q. Next, the power supply portion 51 applies a discharge voltage V1 of 5 V or less to the sample stage 23 for about 1 μsec to 10 msec. The optimum time of the applied time is selected according to the combination of the material of the conductive metal film 112 with the material of the insulating thin film 113. By applying the discharge voltage V1, metal ions are diffused from the conductive metal film 112 into the insulating thin film 113, and a path in which a current flows is formed between the conductive metal film 112 and the sample Q. As shown in FIG. 4, the conductive filament 114 is formed.

In the above description, a voltage is applied to the side of the sample stage 23, and the side of the conductive probe 100 is grounded. However, a structure may be adopted, in which a voltage is applied to the side of the conductive probe 100 and the side of the sample stage 23 is grounded.

Figure 5:
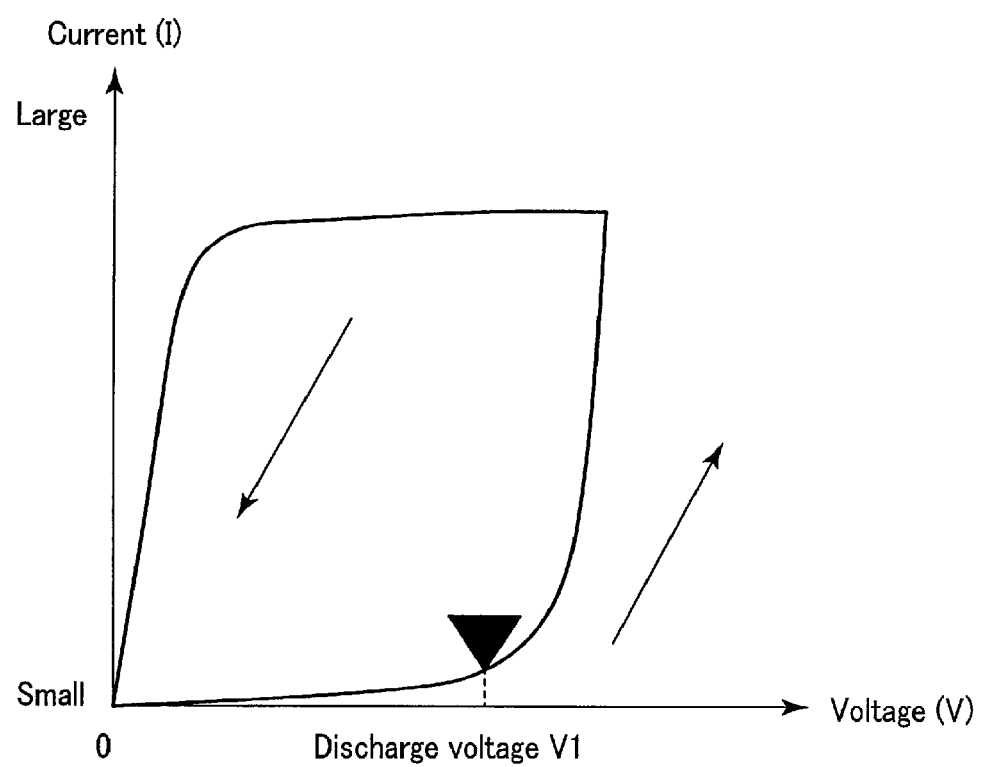
FIG. 5 is an explanatory view showing the manufacturing step of the conductive probe.

On the other hand, as shown in FIG. 5, in the power supply portion 51, an IV curve indicating the relationship between the applied voltage and the current value is acquired. As shown in FIG. 5, when the current flows in a constant amount or more even if the applied voltage is 5V or less, conduction is clear, so that the conductive filament 114 can be confirmed to be formed. Once the conductive filament 114 is formed, the conductive state can be maintained as long as the conductive filament 114 is not damaged as described later.

Thereafter, the horizontal scanning mechanism 22 is operated by the scanning controlling portion 53, and the relative position between the conductive probe 100 and the sample Q is controlled. The conductive probe 100 is moved to a measurement position, and scanning is performed at a measurement voltage V2 of 1 V or less, to conduct electrical property measurement. For example, as shown in FIG. 6, the sample Q is formed by laminating a polysilicon layer Q1 and a silicon oxide layer Q2. A line D having a width δ, for example, is formed in the polysilicon layer Q1. As shown in FIG. 7, when the sample Q is scanned with the measurement voltage V2 applied, a current detected by the conductive probe 100 changes at a position where the line D is provided and a position where the line D is not provided. Based on this amount of change, the width δ of the line D is detected.

The detecting portion 52 detects the value of the current conducted in the conductive probe 100, and the image producing portion 54 maps the detected current value and the relative positional relationship between the sample Q and the conductive probe 100 due to the horizontal scanning mechanism 22, thereby producing and displaying an image. It is possible to evaluate electrical property using the image.

After the completion of the measurement, the conductive probe 100 is moved to the next position, and the measurement voltage V2 is applied to perform second measurement. All measurements are similarly performed.

When the image output from the controlling portion 50 is disturbed, or when the resistance of the conductive probe 100 is increased, the conductive filament 114 is considered to be damaged, so that the measurement is interrupted for replacement.

FIG. 8 shows the relationship between the electric contact radius of a normal conductive probe and the measured line width. The broken line shows a value measured with a high degree of accuracy with a transmission electron microscope (TEM). It is found that, as the electric contact radius of the conductive probe 100 is smaller, the width δ of the line D approaches the measured value obtained by the transmission electron microscope.

The scanning probe microscope 10 having the conductive probe 100 thus configured makes it possible to set the electrical tip radius of the conductive filament 114 to be smaller than that of a normal conductive probe, i.e., 12 nm or less, so that electrical measurement providing a high spatial resolution can be achieved. The conductive filament 114 is covered with the insulating thin film 113 having abrasion resistance, which makes it possible to prolong the life of the conductive probe 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A conductive probe comprising:
   a protruding portion provided on an elastic member;
   a conductive metal film covering at least a tip of the protruding portion;
   an insulating thin film covering a part that faces a sample of the conductive metal film provided on the tip of the protruding portion; and
   a conductive filament of a same material as a material of the conductive metal film, the conductive filament being provided in the insulating thin film so as to extend from a portion bounded on the tip of the protruding portion to a vicinity of a portion contacting the sample.

2. The conductive probe according to claim 1,
wherein:
the elastic member has a cantilever shape; and
the protruding portion is provided on a top portion of the elastic member.

3. The conductive probe according to claim 1,
wherein the conductive metal film contains at least one selected from Ag, Cu, Ni, Ti and W.

4. The conductive probe according to claim 1,
wherein the insulating thin film contains at least one selected from $SiO_2$, SiON, $Ta_2O_5$, AlO, GeSe, $W_mO_n$ and $Mo_mO_n$.

5. An electrical property evaluating system comprising;
a conductive probe comprising a protruding portion provided on an elastic member, a conductive metal film covering at least a tip of the protruding portion, an insulating thin film covering a part that faces a sample of the conductive metal film provided on the tip of the protruding portion, and a conductive filament of a same material as a material of the conductive metal film, the conductive filament being provided in the insulating thin film so as to extend from a portion bounded on the tip of the protruding portion to a vicinity of a portion contacting the sample;
a sample stage provided so as to be able to hold a sample to be measured;
a scanning mechanism scanning the surface of the sample while changing a relative position between the conductive probe and the sample stage;
a power supply portion applying a predetermined voltage between the conductive probe and the sample held by the sample stage; and
a detecting portion detecting a current value varying with scanning of the conductive probe.

6. A scanning probe microscope comprising:
a conductive probe comprising a protruding portion provided on an elastic member, a conductive metal film covering at least a tip of the protruding portion, an insulating thin film covering a part that faces a sample of the conductive metal film provided on the tip of the protruding portion, and a conductive filament of a same material as a material of the conductive metal film, the conductive filament being provided in the insulating thin film so as to extend from a portion bounded on the tip of the protruding portion to a vicinity of a portion contacting the sample;
a sample stage provided so as to be able to hold a sample to be measured;
a scanning mechanism scanning the surface of the sample while changing a relative position between the conductive probe and the sample stage;
a power supply portion applying a predetermined voltage between the conductive probe and the sample held by the sample stage;
a detecting portion detecting a current value varying with scanning of the conductive probe; and
an image producing portion forming an image based on outputs from the scanning mechanism and the detecting portion.

7. A method for manufacturing a conductive probe, the method comprising:
forming a conductive metal film on at least a tip of a protruding portion provided on an elastic member;
forming an insulating thin film covering a part that faces a sample of the conductive metal film formed on the tip of the protruding portion; and
applying a voltage to the protruding portion to diffuse metal ions from the conductive metal film, thereby forming a conductive filament so as to extend from a portion bounded on the tip of the protruding portion to a vicinity of a portion contacting the sample.

8. A conductive probe comprising:
a protruding portion provided on an elastic member;
a conductive metal film covering at least a tip of the protruding portion;
an insulating thin film covering a part that faces a sample of the conductive metal film provided on the tip of the protruding portion; and
a conductive filament bringing the protruding portion and the sample into conduction by metal ions diffused from the conductive metal film into the insulating thin film by application of a voltage between the conductive probe and the sample.

9. An electrical property evaluating system comprising:
a conductive probe comprising a protruding portion provided on an elastic member, a conductive metal film covering at least a tip of the protruding portion, an insulating thin film covering a part that faces a sample of the conductive metal film provided on the tip of the protruding portion, and a conductive filament bringing the protruding portion and the sample into conduction by metal ions diffused from the conductive metal film into the insulating thin film by application of a voltage between the conductive probe and the sample;
a sample stage provided to be able to hold a sample to be measured;
a scanning mechanism scanning the surface of the sample while changing a relative position between the conductive probe and the sample stage;
a power supply portion applying a predetermined voltage between the conductive probe and the sample held by the sample stage; and
a detecting portion detecting a current value varying with scanning of the conductive probe.

* * * * *